United States Patent
Mochizuki et al.

(10) Patent No.: US 9,661,188 B2
(45) Date of Patent: May 23, 2017

(54) IMAGE PROCESSING APPARATUS AND METHOD OF CONTROLLING THE SAME

(71) Applicant: CANON KABUSHIKI KAISHA, Tokyo (JP)

(72) Inventors: Yugo Mochizuki, Kawasaki (JP); Fumihiro Goto, Kawasaki (JP); Akihiko Nakatani, Kawasaki (JP); Okinori Tsuchiya, Kawasaki (JP); Takashi Nakamura, Yokohama (JP); Takashi Fujita, Kawasaki (JP); Ayumi Sano, Kawasaki (JP); Mitsuhiro Ono, Tokyo (JP); Hidetsugu Kagawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 185 days.

(21) Appl. No.: 14/591,486

(22) Filed: Jan. 7, 2015

(65) Prior Publication Data

US 2015/0124301 A1 May 7, 2015

Related U.S. Application Data

(63) Continuation of application No. 13/933,430, filed on Jul. 2, 2013, now Pat. No. 8,965,138.

(30) Foreign Application Priority Data

Jul. 9, 2012 (JP) .................................. 2012-154001

(51) Int. Cl.
*G06K 9/36* (2006.01)
*H04N 1/64* (2006.01)
(Continued)

(52) U.S. Cl.
CPC .................. *H04N 1/64* (2013.01); *G06T 9/00* (2013.01); *H04N 1/41* (2013.01); *H04N 1/4115* (2013.01);
(Continued)

(58) Field of Classification Search
CPC .......... H04N 19/176; H04N 7/50; H04N 7/30; H04N 7/26244; H04N 7/26313; H04N 7/26079
See application file for complete search history.

(56) References Cited

U.S. PATENT DOCUMENTS 8,965,138 B2 * 2/2015 Mochizuki ........... H04N 19/176
  382/232
2004/0001230 A1 1/2004 Kagawa ........................ 358/2.1

FOREIGN PATENT DOCUMENTS

JP H09-238366 9/1997
JP H11-008770 1/1999
(Continued)

OTHER PUBLICATIONS

Counterpart office action, Japanese Application No. 2012-154001, dated Aug. 19, 2016.

*Primary Examiner* — Duy M Dang
(74) *Attorney, Agent, or Firm* — Fitzpatrick, Cella, Harper & Scinto

(57) ABSTRACT

In an image processing apparatus for encoding image data and a method of controlling the same, whether an attribute of each of a plurality of areas in image data corresponds to an edge in an image based on the image data is determined, and one of a plurality of sub-sampling processes is selected according to the determination for each of the plurality of areas. Note that the plurality of sub-sampling processes can sub-sample color difference components of each of the plurality of areas by different processes. By the sub-sampling process selected as that corresponding to each of the (Continued)

plurality of areas, each of the plurality of areas is sub-sampled to encode the image data.

20 Claims, 9 Drawing Sheets

(51) Int. Cl.
    *G06T 9/00*         (2006.01)
    *H04N 19/176*     (2014.01)
    *H04N 19/60*      (2014.01)
    *H04N 19/132*     (2014.01)
    *H04N 19/14*      (2014.01)
    *H04N 19/186*     (2014.01)
    *H04N 19/59*      (2014.01)
    *H04N 1/41*       (2006.01)
    *H04N 19/102*     (2014.01)
    *H04N 1/411*      (2006.01)

(52) U.S. Cl.
    CPC ........... *H04N 1/642* (2013.01); *H04N 19/102* (2014.11); *H04N 19/132* (2014.11); *H04N 19/14* (2014.11); *H04N 19/176* (2014.11); *H04N 19/186* (2014.11); *H04N 19/59* (2014.11); *H04N 19/60* (2014.11)

(56) References Cited

FOREIGN PATENT DOCUMENTS

| | | |
|---|---|---|
| JP | 2000-278709 A | 10/2000 |
| JP | 2003-274190 | 9/2003 |
| JP | 2004-034327 A | 2/2004 |

\* cited by examiner

FIG. 7A
| | SOLID | EDGE | HALFTONE DOT | EDGE + HALFTONE DOT |
|---|---|---|---|---|
| COMMON | 0 | 0 | -3 | -3 |
| CHARACTER | 0 | 1 | -3 | -3 |
| IMAGE | 0 | 0 | -3 | -3 |
| WHITE BACKGROUND | 0 | 0 | -3 | -3 |
FIG. 7B
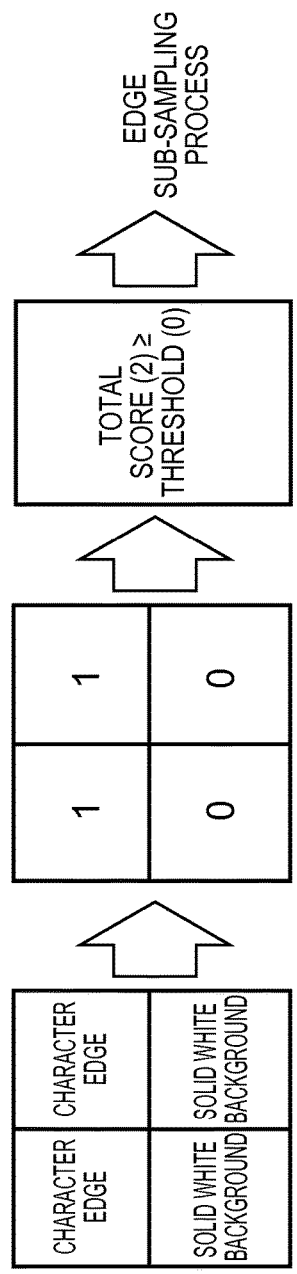
FIG. 7C
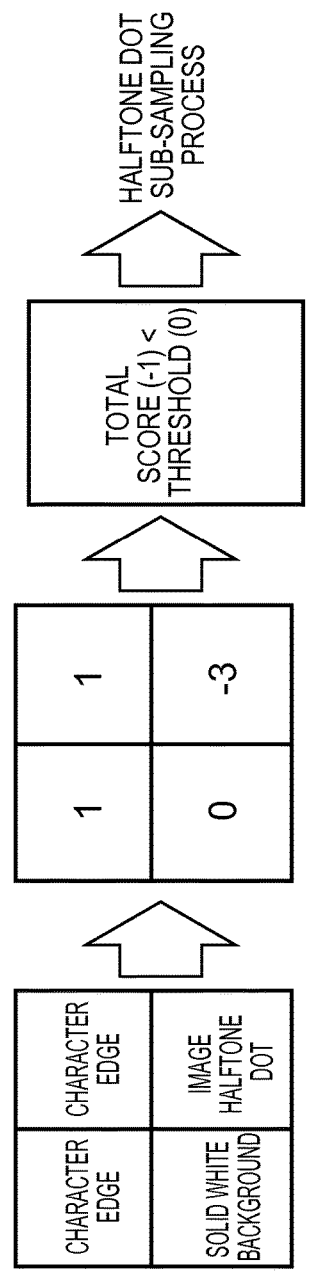

IMAGE PROCESSING APPARATUS AND METHOD OF CONTROLLING THE SAME

CROSS REFERENCE TO RELATED APPLICATION

The present application is a continuation of U.S. patent application Ser. No. 13/933,430, filed Jul. 2, 2013, now U.S. Pat. No. 8,965,138, issued Feb. 24, 2015. The entire disclosure of the earlier application is hereby incorporated by reference herein.

BACKGROUND OF THE INVENTION

Field of the Invention

The present invention relates to an image processing apparatus and method of controlling the same.

Description of the Related Art

In recent years, computerization has advanced, and a system which scans a paper document using a scanner or the like to convert it into digital data in place of storing the paper document intact, and transmits the digital data to another apparatus has prevailed. On the other hand, in order to save transmission cost of digital data and a storage area of a storage device, it is required to highly compress digital document data.

However, if a document image includes both a character area and photo area, and if compression (for example, lossless compression) suited to the character area is applied to the entire document image, image quality after decoding is high but a low compression ratio is obtained. On the other hand, if compression (for example, lossy compression such as JPEG) suited to the photo area is applied to the entire document image, a high compression ratio is obtained, but character images after decoding deteriorate.

Conventionally, as an image compression method, a coding method for encoding image data by transforming it into data on a frequency space is used. JPEG recommended as an international standard method of still image coding is a typical example of transformation coding using DCT (Discrete Cosine Transform) in transformation onto the frequency space. Processes of JPEG coding processing will be briefly described below.

An image to be encoded is divided into rectangular blocks, and DCT transformation is applied to respective pixel values in each block. Coefficients obtained by this transformation are quantized according to a desired image quality level and code size, and quantized transformation coefficients are entropy-encoded. JPEG Baseline adopts Huffman coding as an entropy coding method of coefficients. Since one block includes 8×8 pixels (=64 pixels), the DCT transformation generates one DC component value and 63 AC component values. The DC component value is encoded as a difference value from an immediately preceding block, and the AC component values are Huffman-encoded by a combination of zero runs and non-zero coefficient values.

Note that in order to increase a compression ratio, a method of sampling a block of 8×8 pixels as follows is available. Luminance components and color difference components are acquired from input image data to generate blocks of 16×16 pixels. As for luminance components (Y), four blocks of 8×8 pixels are used as luminance plane data. As for color difference components (Cb, Cr), 2×2 pixels are combined to obtain one pixel value, thereby generating color difference plane data of one block of 8×8 pixels (FIG. 1A). The aforementioned processing is that generally called 4:1:1 sub-sampling, and the resolutions of color difference components are ½ of those of luminance components respectively in vertical and horizontal directions. As a result, the compression ratio can be doubled. Likewise, processing called 4:2:2 sub-sampling in which the resolution in only the vertical or horizontal direction is halved is available (FIG. 1B). Furthermore, FIG. 1C shows an example of 4:4:4 sub-sampling.

However, if the aforementioned sub-sampling which lowers the resolution of color difference components is applied, a higher compression ratio can be assured but color difference components deteriorate considerably. Especially, color cloud (false color generated by combining inner and outer pixels of an edge) is generated at an edge portion, resulting in a visually unnatural image.

As for reproducibility of colors at an edge portion, Japanese Patent Laid-Open No. 2000-278709 describes a method of improving color reproducibility at an edge portion by generating a new border portion using color difference components in shape data at a border portion of the shape data which expresses a shape of an object. However, in scan data of a hatching pattern or halftone document, if a hatch or halftone dot is determined as an edge, and the same processing as that for shape data such as characters is applied, an undesirable result is generated. More specifically, a tincture may be changed, or moiré may be generated.

SUMMARY OF THE INVENTION

An aspect of the present invention is to eliminate the above-mentioned problems which are found in the conventional technology.

A feature of the present invention is to provide a technique which allows appropriate coding processing according to attributes of areas by changing sub-sampling processing according to the attributes of the areas of an image.

According to an aspect of the present invention, there is provided an apparatus comprising: a determination unit configured to determine whether an attribute of each of a plurality of areas in image data corresponds to an edge in an image based on the image data; a sub-sampling unit configured to sub-sample color difference components of each of the plurality of areas by a plurality of different processes; a selection unit configured to select a sub-sampling process corresponding to each of the plurality of areas from the plurality of processes configured to be executed by the sub-sampling unit in accordance with the determination for each of the plurality of areas by the determination unit; and an encoder configured to encode image data, each of the plurality of areas of which is sub-sampled by the sub-sampling process corresponding to each of the plurality of areas selected by the selection unit.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7A depicts a view for explaining determination results of area attributes and area attribute scores according to the first embodiment, and FIGS. 7B and 7C depict views showing scores of a block of 2×2 pixels and a selection example of a sub-sampling processing;

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Processing for filling a speed gap between a scanner and printer in an MFP (Multi Function Peripheral) according to an embodiment by compressing image data scanned by a scanner in a copy mode and storing the compressed image data in a memory, and for increasing a copy speed by reducing an extra waiting time will be exemplified. The embodiment of the present invention will be described in detail hereinafter with reference to the drawings.

Figure 1A:
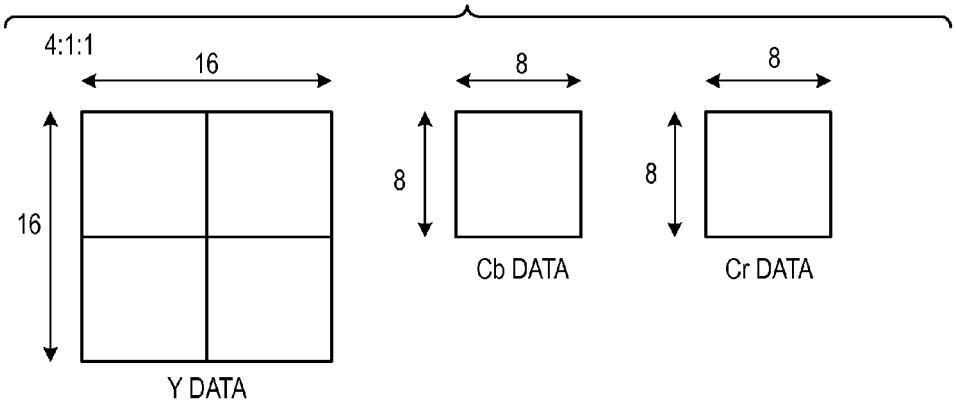
FIGS. 1A to 1C depict views showing generation states of luminance plane data and color difference plane data by sub-sampling processing.
Figure 1B:
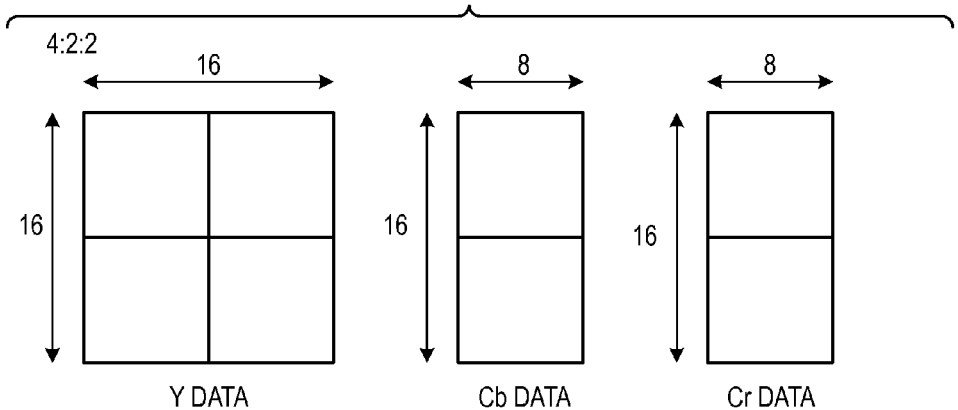
Figure 1C:
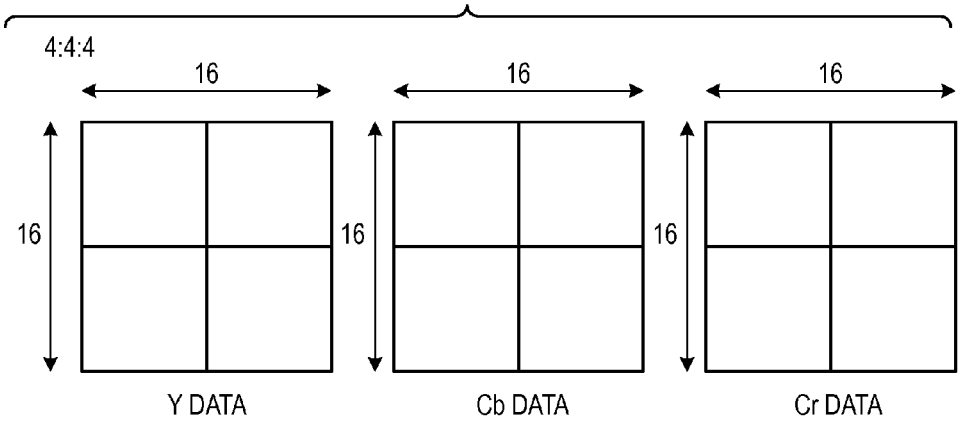
Figure 2A:
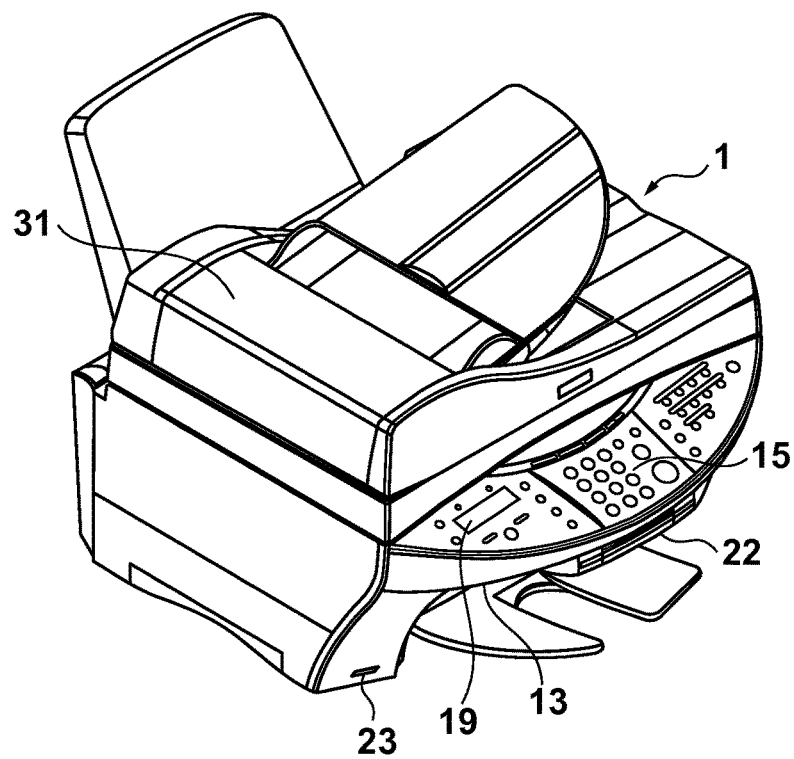
FIGS. 2A and 2B depict perspective views showing overviews of an MFP (Multi Function Peripheral) according to a first embodiment.
Figure 2B:
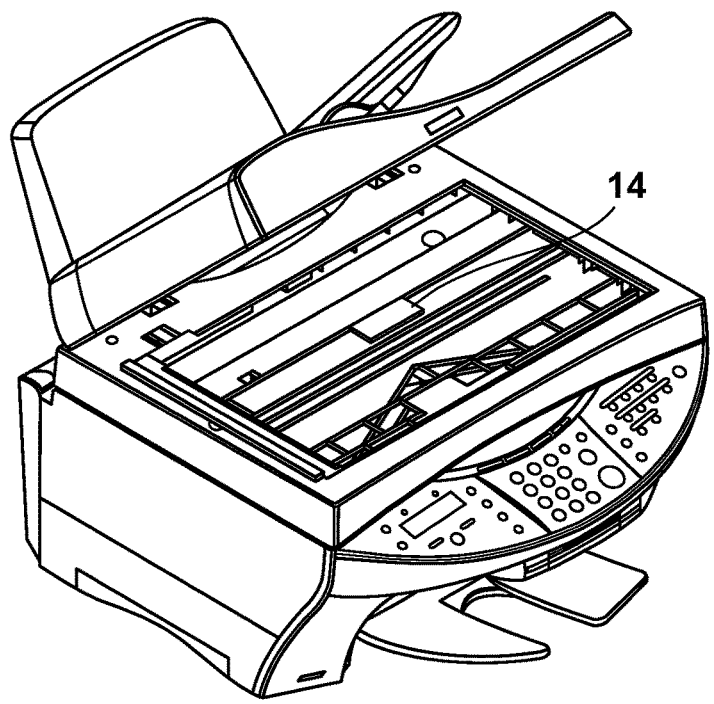

FIGS. 2A and 2B depict perspective views showing overviews of an MFP 1 according to the first embodiment of the present invention. FIG. 2A shows a state in which an ADF (Auto Document Feeder) 31 of the MFP 1 is closed, and FIG. 2B shows a state in which the ADF 31 is open.

This MFP 1 basically has a function as a printer which receives data from a host computer (PC) and prints that data and a function as a scanner. Furthermore, the MFP 1 also has, as operation functions of the MFP 1 alone, a copy function of printing an image scanned by a scanner using a print unit, and a function of reading image data from a storage medium such as a memory card and printing the read image data. Moreover, the MFP 1 has a function of directly receiving image data from a digital camera and printing the received image data.

Referring to FIGS. 2A and 2B, the MFP 1 includes a scanning unit 14 such as a flatbed scanner, and a print unit 13 of an inkjet or electrophotography system. Also, the MFP 1 includes a display unit 19 such as a display panel and an operation panel 15 including various key switches. A USB port (not shown) used to communicate with a PC is arranged on the back surface of the MFP 1, thus making communications with the PC connected via a USB cable. Also, the MFP 1 includes a card interface 22 including a card slot used to read out data from various memory cards, and a camera interface 23 including a camera port required to make data communications with a digital camera.

Figure 3:
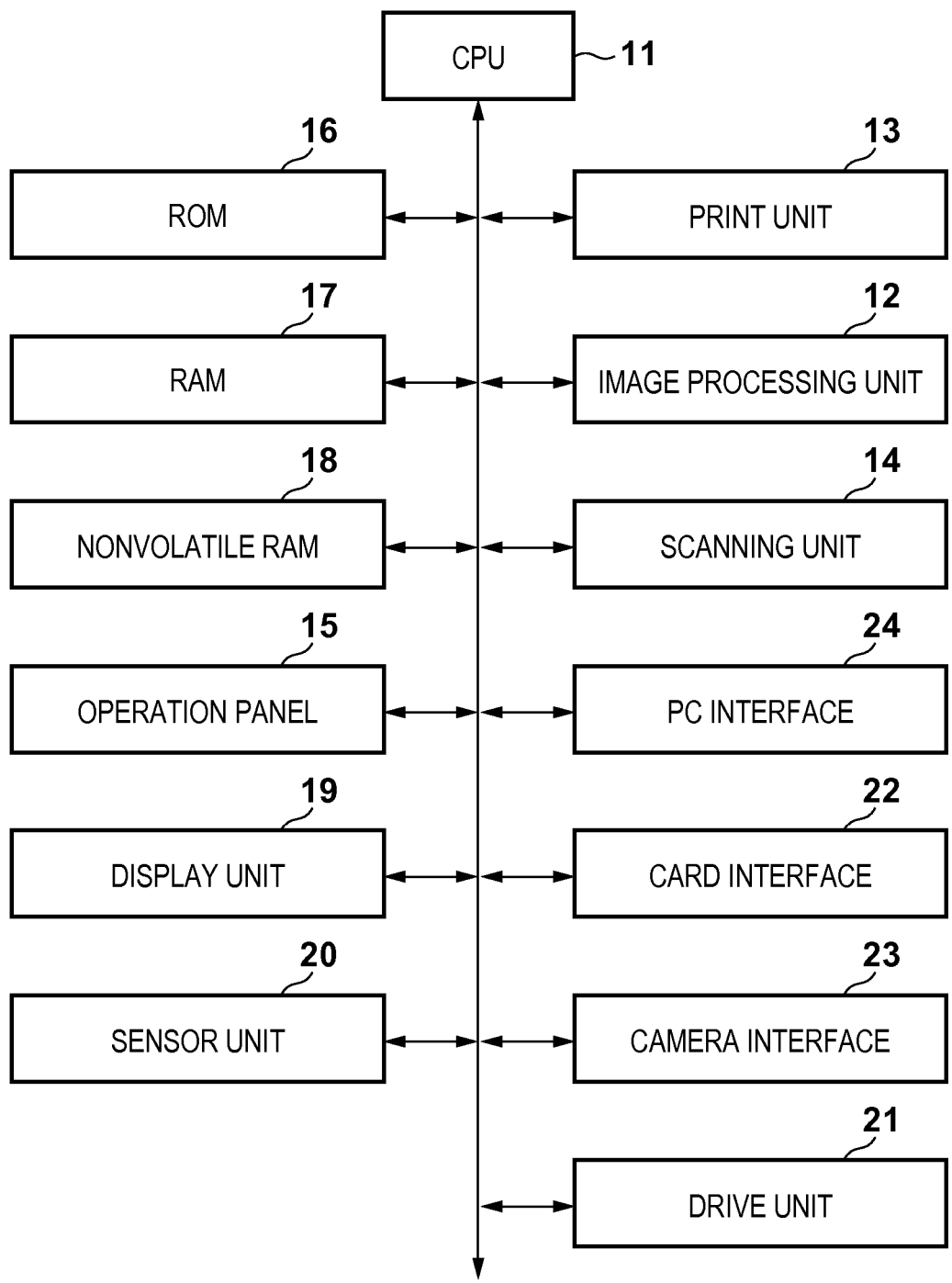
FIG. 3 is a block diagram showing the arrangement of the MFP according to the first embodiment.

FIG. 3 is a block diagram showing the arrangement of the MFP 1 according to the first embodiment, and the same reference numerals denote parts common to those in FIGS. 2A and 2B.

Referring to FIG. 3, a CPU 11 controls various functions included in the MFP 1, and executes a control program stored in a ROM 16 in accordance with a user instruction input from the operation panel 15. By executing this control program, the CPU 11 can select a pixel to be processed, and can also extract an image area having a predetermined size including the pixel to be processed. The ROM 16 stores various tables and mathematical expressions used in image processing in addition to this control program. The scanning unit 14 including a CCD scans an image of a document, and outputs red (R), green (G), and blue (B) analog luminance data. Note that the scanning unit 14 may include a contact image sensor (CIS) in place of the CCD.

The card interface 22 can connect a memory card or the like which stores image data captured by, for example, a digital still camera (to be abbreviated as DSC hereinafter), and can load image data stored in the memory card. The camera interface 23 can directly connect the DSC, and is used to acquire image data from that DSC and to output various instructions to the DSC.

An image processing unit 12 executes conversion of scanned image data, image correction/modification processes, conversion from luminance signals (RGB) into density signals (CMYK), and image processes such as scaling, gamma conversion, and error diffusion. The image correction processes executed by the image processing unit 12 includes an edge emphasis process, smoothing process, replacement process, achromatic process, and the like. Image data obtained by the image processes by the image processing unit 12 is stored in a RAM 17. When an amount of image data stored in the RAM 17 reaches a predetermined size, print processing by the print unit 13 is executed.

As a nonvolatile memory 18, a battery backed-up SRAM or the like can be used, and the nonvolatile memory 18 stores data unique to the MFP 1 and the like.

The operation panel 15 includes a photo-direct print start key used to select image data stored in a storage medium (memory card) and to instruct to print the image data. Also, the operation panel 15 includes a key used to print an order sheet, a key used to scan the order sheet, and the like. Furthermore, the operation panel 15 may include a copy start key in a monochrome copy mode or color copy mode, a mode key used to designate modes such as a copy resolution, image quality, and the like, a stop key used to stop a copy operation or the like, a numerical keypad used to input the number of copies and the like, a registration key, and the like. The CPU 11 detects pressing states of these keys, and controls respective units according to the detected states.

The display unit 19 includes a liquid crystal display unit (LCD) of a dot matrix type and an LCD driver, and makes various displays under the control of the CPU 11. Also, the display unit 19 is used to display thumbnails of image data recorded in a storage medium such as a memory card. The print unit 13 includes an inkjet head of an inkjet system, general-purpose IC, and the like, and executes print processing according to print data stored in the RAM 17 under the control of the CPU 11.

A drive unit 21 is used to operate the scanning unit 14 and print unit 13, and includes stepping motors required to drive paper feed/discharge rollers, gears required to transmit driving forces for the stepping motors, driver circuits required to control the stepping motors, and the like.

A sensor unit 20 includes a print paper width sensor, print paper sensor, document width sensor, document sensor, recording medium detection sensor, and the like. The CPU 11 detects states of a document and print sheet based on information obtained from the sensor unit 20. A PC interface 24 is that with a PC, and the MFP 1 receives data from the PC via the PC interface 24 to execute operations such as printing and scanning according to instructions from the PC.

In a copy mode, image data scanned by the scanning unit 14 undergoes data processing inside the MFP 1, and is printed by the print unit 13. When the user instructs a copy mode from the operation panel 15, the scanning unit 14 scans a document placed on a platen, and image data obtained by scanning is sent to the image processing unit 12 to undergo image processes. Then, the image data is output to the print unit 13 and is printed. As copy functions, a high-speed copy mode in which blank areas are skipped (without scanning the inkjet head), a middle-speed copy mode for printing a monochrome image using only a black ink, a low-speed copy mode for printing a color image using multi-color inks, and the like are available. In these modes, the processing speeds of the print unit 13 are different, but the scanning unit 14 scans a document image at a constant speed. Hence, using an intermediate buffer which is assured for a predetermined area on the RAM 17, the speed differences are absorbed.

Figure 4:
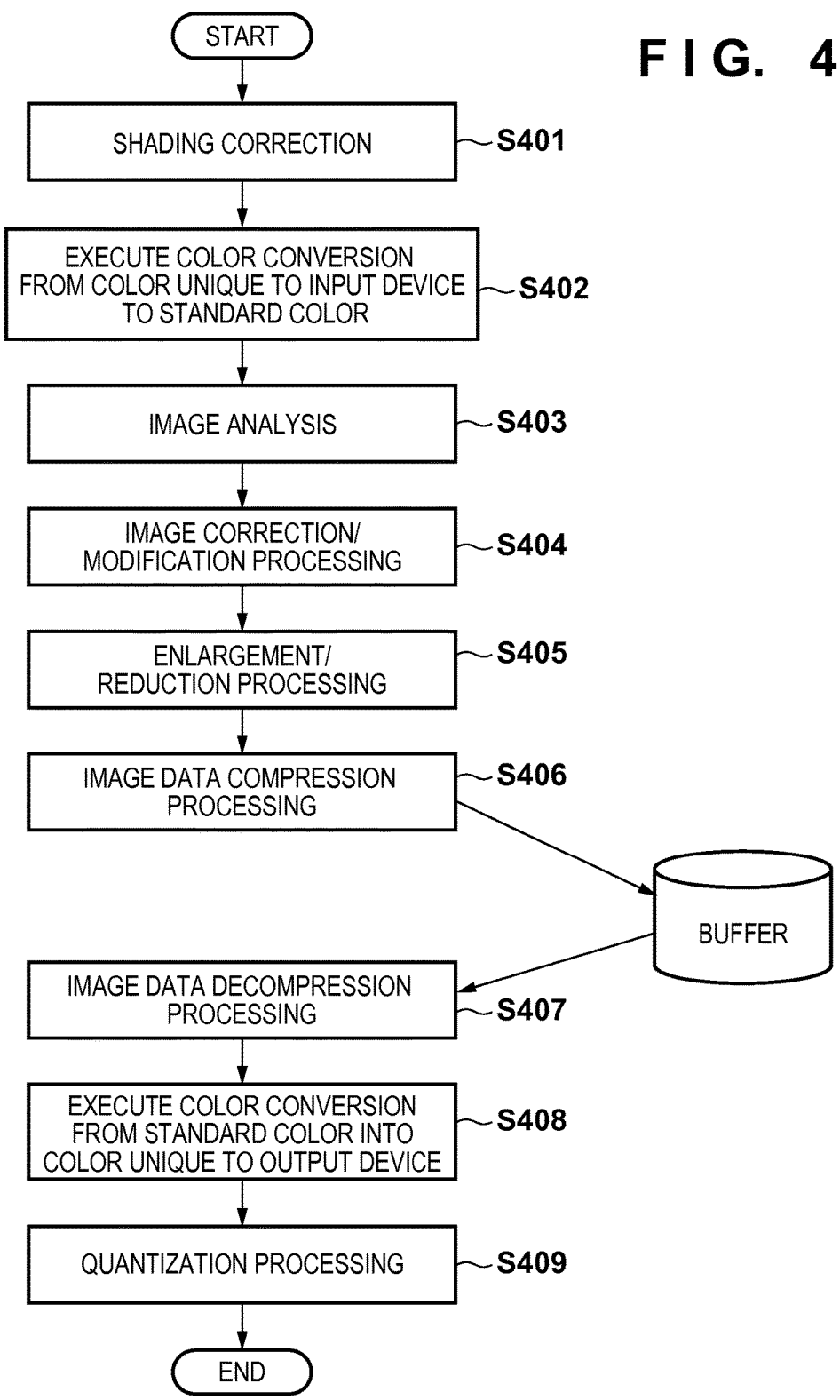
FIG. 4 is a flowchart for describing copy processing in the MFP according to the first embodiment.

FIG. 4 is a flowchart for describing copy processing in the MFP 1 according to the first embodiment. A program required to execute this processing is stored in the ROM 16, and this processing is implemented when the CPU 11 executes this program.

In step S401, the CPU 11 applies shading correction required to correct variations of image sensors to image data, which is scanned by the scanning unit 14 and is A/D-converted. The process then advances to step S402, and the CPU 11 executes color conversion of the image data after the shading correction from colors unique to an input device into standard colors. Thus, the image data having device-dependent color characteristics is converted into that on a standard color space domain. Such standard color space includes sRGB specified by IEC (International Electrotechnical Commission), Adobe RGB proposed by Adobe Systems, and the like. This conversion process includes a matrix calculation process, a lookup table process, and the like.

The process then advances to step S403, and the CPU 11 applies image analysis processing to the image data converted in step S402. Details of this processing will be described later. The process advances to step S404, and the CPU 11 applies correction and modification processes to the image data converted in step S402. The processing contents include an edge emphasis process for correcting blurring caused by scanning, a character modification process for improving legibility of characters, a process for removing an offset caused by scanning upon irradiation of light, and the like. In this case, an application amount can also be changed according to the image analysis result in step S403.

The process then advances to step S405, and the CPU 11 executes enlargement/reduction processing for the image data. When the user designates a variable magnification mode or layout copy mode which lays out two document images on a single sheet, the image data is converted into that at a desired magnification. This conversion process generally uses a bicubic method or nearest neighbor method.

The process advances to step S406, and the CPU 11 applies compression processing to the image data. As a compression process in this step, a JPEG standard or the like is used. Details of this compression process will be described later. The compressed data is stored in a buffer assured on the RAM 17. By storing a plurality of pieces of image data, a reverse copy mode and plural copy mode can be executed.

The process advances to step S407, and the CPU 11 executes decompression processing of the compressed image data. The process advances to step S408, and the CPU 11 converts the data on the standard color space into that on a color space unique to an output device. The print system of the MFP 1 according to this embodiment is an inkjet system, and the CPU 11 executes conversion processing into ink color data such as cyan, magenta, yellow, and black data. This conversion can use an inverse conversion process in step S402. Then, the process advances to step S409, and the CPU 11 quantizes the image data to convert it into the printable number of levels (number of bits). In this case, for example, if whether an ink dot is ON (eject) or OFF (non-eject) is expressed using two values, the image data can be binarized by a quantization process such as error diffusion. Thus, the image data can be converted into a data format that can be printed by the print unit 13, and print processing is executed based on that data, thus forming an image.

Figure 5:
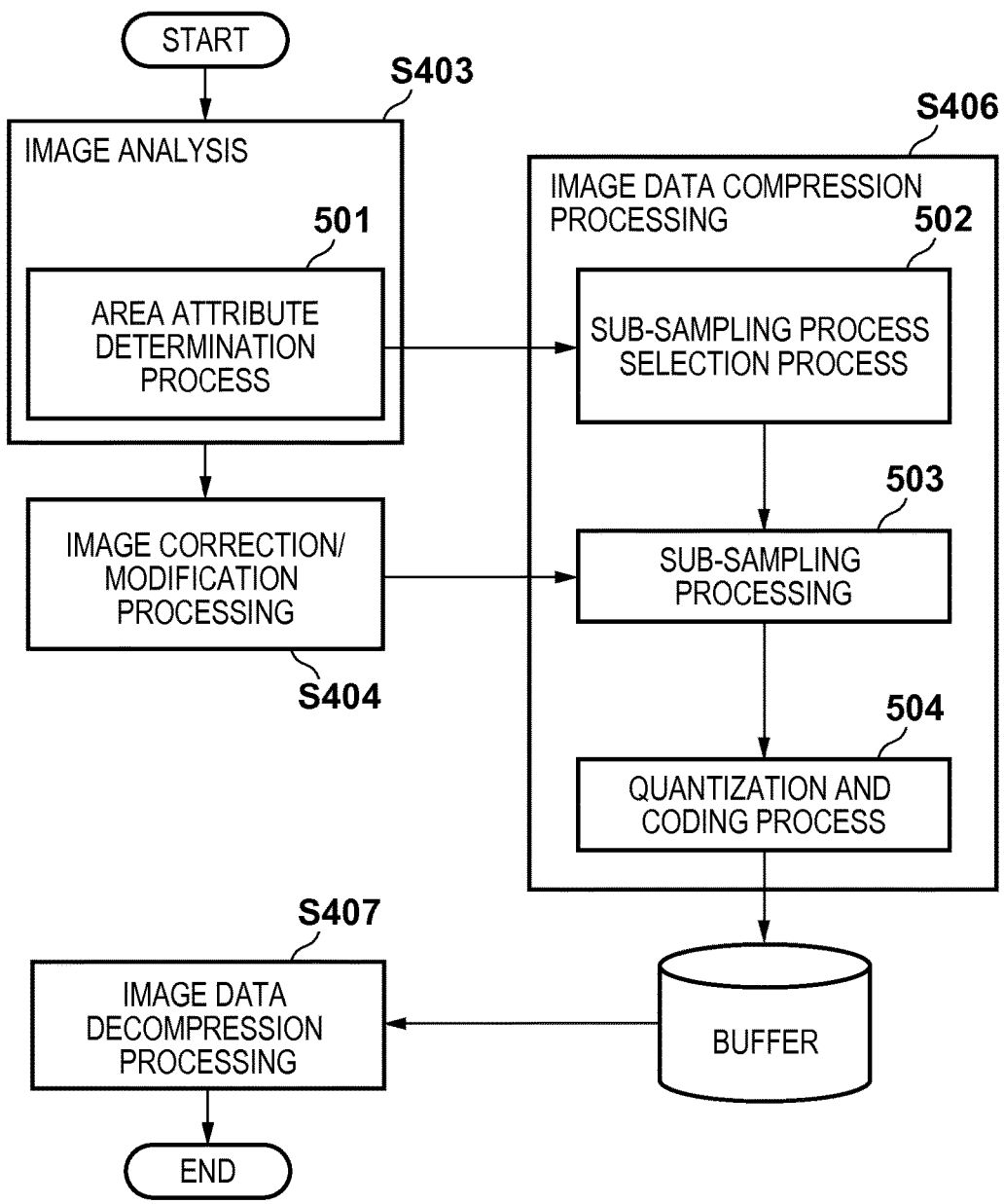
FIG. 5 is a block diagram for explaining, in more detail, image analysis processing and data compression processing by the MFP according to the first embodiment.

FIG. 5 is a block diagram for explaining, in more detail, the image analysis processing and data compression processing by the MFP 1 according to the first embodiment.

An area attribute determination process 501 is included in the image analysis processing in step S403 of FIG. 4. A sub-sampling process selection process 502, sub-sampling process 503, and quantization and coding process 504 correspond to details of the compression processing of the image data in step S406 of FIG. 4.

In the area attribute determination process 501, at least a character area and halftone dot area are separated from the scanned image data. In this process, as described in, for example, Japanese Patent Laid-Open No. 2008-011267, a luminance variation time count is calculated for each block including a target pixel to determine an edge/non-edge and a halftone dot/non-halftone dot, and to further determine a character portion/image portion/blank background portion.

Results of this area attribute determination process 501 can be expressed using a matrix format which associates attributes with scores, as shown in FIG. 7A. As expressed by this matrix, a score of an attribute is decided in advance according to an attribute determination result, and a sub-sampling process in the data compression processing is selected with reference to this score table. For example, in FIG. 7A, a score at a character edge is set to be "1", and a score at an image edge is set to be "0". If a halftone dot is detected, its score is set to be "−3".

The image data compression processing in step S406 executes the sub-sampling process selection process 502 for selecting a sub-sampling process based on attribute information of an area determined in the area attribute determination process 501. Next, the sub-sampling process 503 for acquiring luminance components (Y) and color difference components (Cb, Cr) from the image data, and executing sub-sampling by the sub-sampling process selected by the sub-sampling process selection process 502 is executed. Furthermore, the quantization and coding process 504 for quantizing and encoding luminance plane data and color difference plane data of 8×8 pixels generated by the sub-sampling process 503 is executed.

The sub-sampling process selection process and sub-sampling process in case of 4:1:1 sub-sampling will be described in detail below.

As sub-sampling processes, the following two processes are prepared.

(A) Edge sub-sampling process (first sub-sampling): a maximum color difference component in a block of 2×2 pixels is set as color difference plane data of that block.

(B) Halftone dot sub-sampling process (second sub-sampling): an average value of color difference components in a block of 2×2 pixels is set as color difference plane data of that block.

The sub-sampling process selection process 502 switches whether to execute the sub-sampling process (A) or (B) according to the area attribute determination result of the area attribute determination process 501. A practical switching process will be described below.

Figure 6:
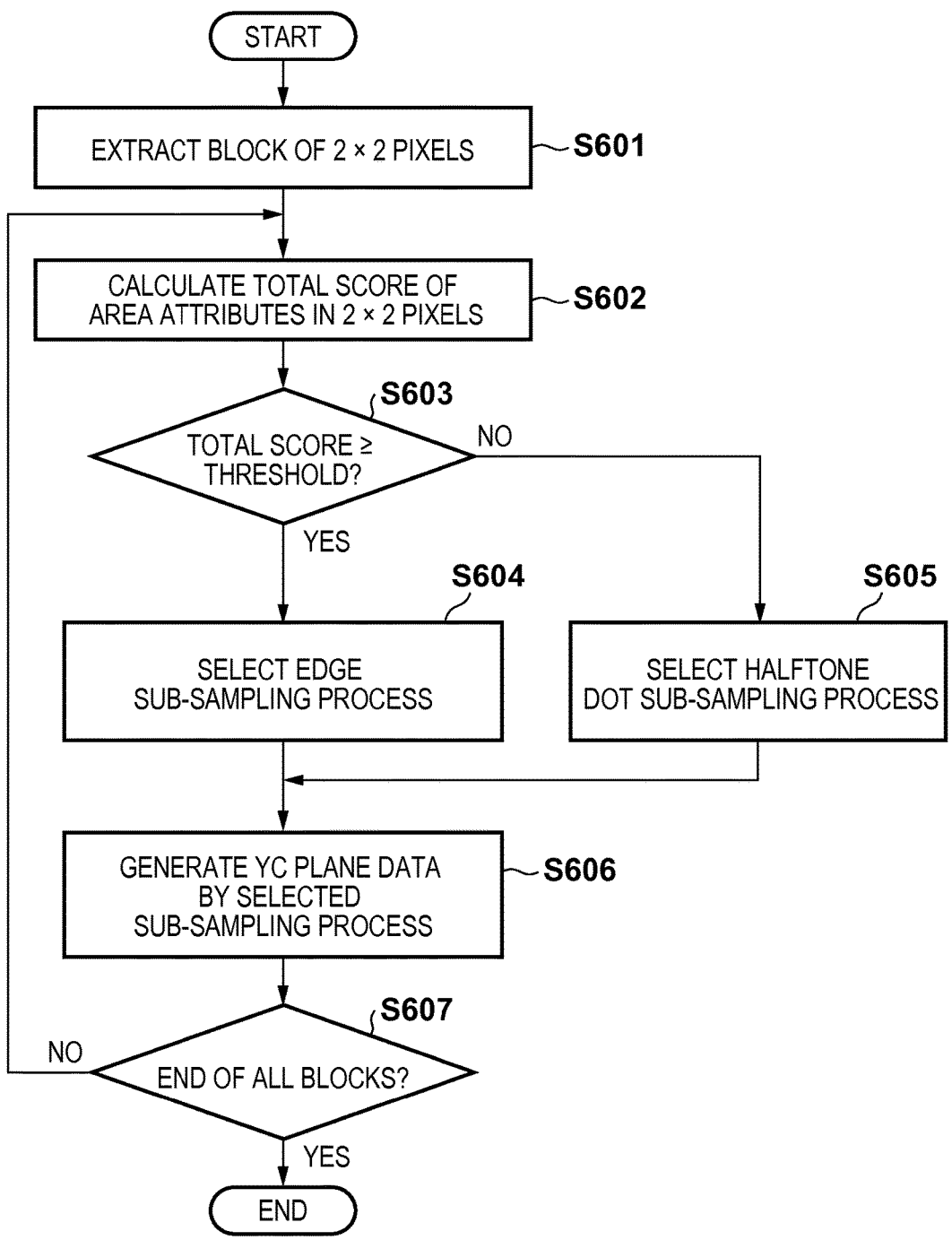
FIG. 6 is a flowchart for describing switching processing of sub-sampling processing in the MFP according to the first embodiment.

FIG. 6 is a flowchart for describing sub-sampling process switching processing in the MFP 1 according to the first embodiment. A program required to execute this processing is stored in the ROM 16, and this processing is implemented when the CPU 11 executes this program.

The CPU 11 extracts a block of 2×2 pixel from image data in step S601, and calculates a total value of scores (area attribute total score) in the 2×2 pixels with reference to the area attribute score table shown in FIG. 7A in step S602. Then, the process advances to step S603, and the CPU 11 compares the total value calculated in step S602 with a threshold, which is set in advance, so as to switch the sub-sampling process according to the comparison result. In this case, if the (area attribute total score) threshold, the target 2×2 pixels are determined as an edge, and the process advances to step S604 to select the edge sub-sampling process. On the other hand, if the (area attribute total score)<threshold, the CPU 11 determines that the 2×2 pixels correspond to a halftone dot in step S603, and the process advances to step S605, thus selecting the halftone dot sub-sampling process.

If, for example, the threshold is set to be "0", and 2×2 pixels respectively have attributes "character edge", "character edge", "solid white background", and "solid white background", their total value is 1+1+0+0=2 from FIG. 7A. In this case, since the total value "2" is larger than the threshold "0", the edge sub-sampling process (A) is selected for this 2×2 area (see FIG. 7B).

If 2×2 pixels respectively have attributes "character edge", "character edge", "solid white background", and "image halftone dot", their total value is 1+1+0+(−3)=−1 from FIG. 7A. In this case, since the total value "−1" is smaller than the threshold "0", the halftone dot sub-sampling process (B) is selected for this 2×2 area (see FIG. 7C).

When the area attribute score table and threshold are set in this way, if no halftone dot is included but a character edge is included for at least one pixel, the aforementioned sub-sampling process (A) is selected. If a halftone dot is included for at least one pixel, the aforementioned sub-sampling process (B) is selected.

In this case, the processes (A) and (B) are switched using one threshold. Alternatively, the processes (A) and (B) may be blended and processed at a certain ratio according to the score, thus improving continuity of an image.

Using the sub-sampling process selected in step S604 or S605 in this way, the CPU 11 generates luminance plane data (Y) and color difference plane data (Cb, Cr) in step S606. Then, the CPU 11 checks in step S607 whether or not processing is complete for all blocks of the image data. If the processing is not complete yet, the process returns to step S602 to execute the aforementioned processes. If the processing is complete for all the blocks of the image data, this processing ends.

As described above, according to the first embodiment, for example, image data is divided into blocks each including 2×2 pixels, and selects the appropriate sub-sampling process according to an attribute of each block to encode the block. In this manner, sub-sampling processes suited to attributes of an image can be executed, and image quality of an image formed based on decoded image data can be improved.

Note that the first embodiment has explained the case of 4:1:1 sub-sampling, but it is also applicable to other sub-sampling ratios (for example, 4:2:2).

Second Embodiment

This second embodiment will explain an example in which satisfactory effects can be obtained for CIS color misregistration by adding color attribute determination processing although nearly the same arrangement as that of the aforementioned first embodiment is used.

In a scanner which mounts a CIS unit, RGB LEDs are turned on in turn while moving the CIS unit, thus scanning R, G, and B components of a document in turn. Thus, the scanning timings of the respective color components are different, and false colors which are not included in the original document are unwantedly generated at edge portions. This is CIS color misregistration.

Figure 8:
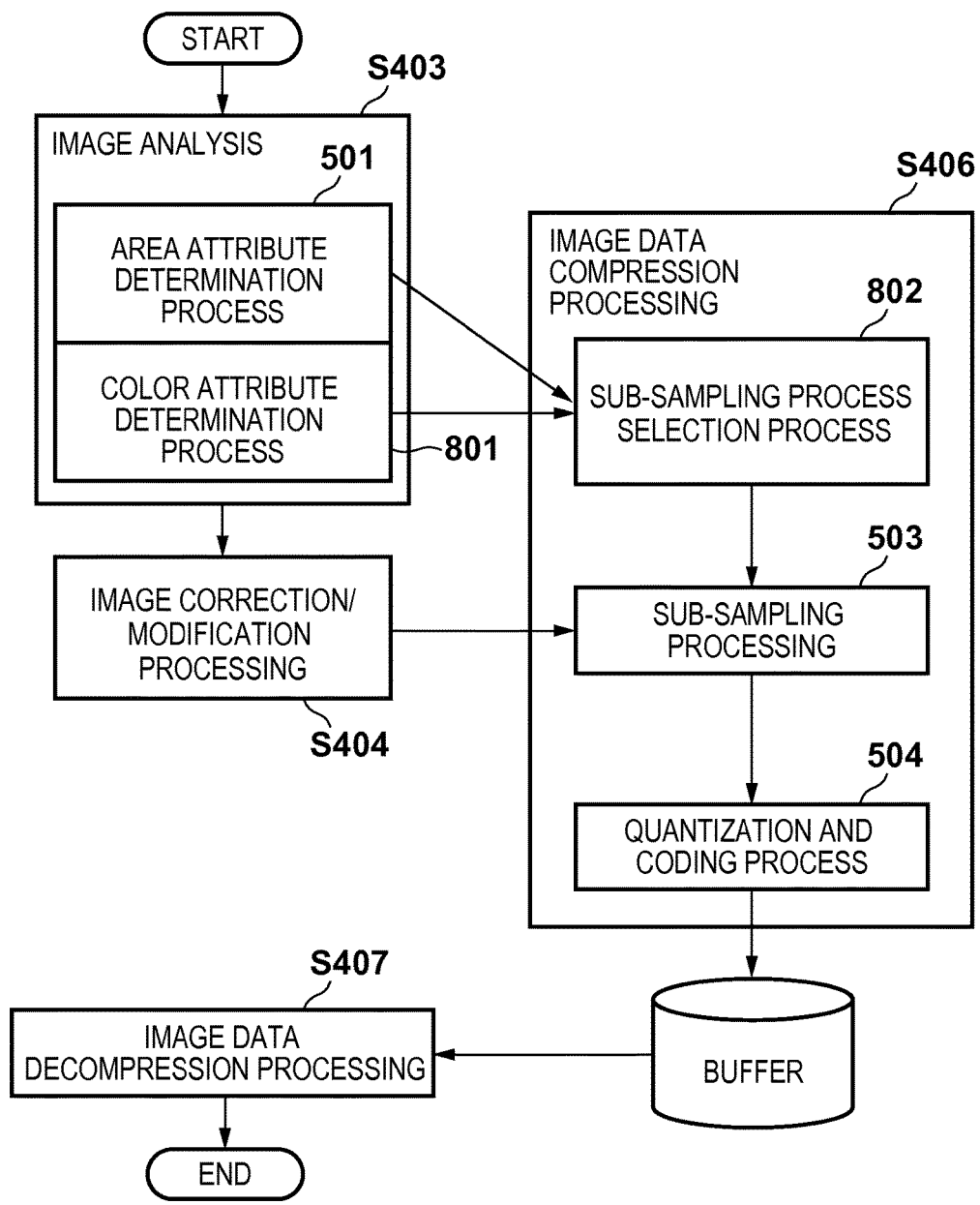
FIG. 8 is a block diagram for explaining, in more detail, image analysis processing and data compression processing by an MFP according to a second embodiment.

FIG. 8 is a block diagram for explaining, in more detail, image analysis processing and data compression processing in an MFP 1 according to the second embodiment of the present invention. In FIG. 8, a color area determination process 801 is executed in addition to the arrangement shown in FIG. 5 of the aforementioned first embodiment. Note that in FIG. 8, the same reference numerals denote parts common to FIG. 5, and a description thereof will not be repeated.

Image data compression processing in step S406 includes a sub-sampling process selection process 802 for selecting a sub-sampling process based on area attribute information determined in an area attribute determination process 501 and color attribute information determined in the color attribute determination process 801. Also, the image data compression processing in step S406 also includes a sub-sampling process 503 which acquires a luminance component (Y) and color difference components (Cb, Cr) from image data, and executes sub-sampling by the selected sub-sampling process. Furthermore, the image data compression processing in step S406 includes a quantization and coding process 504 which quantizes and encodes luminance plane data and color difference plane data of 8×8 pixels generated in the sub-sampling process 503.

The color attribute determination process 801 determines whether a target pixel belongs to a monochrome area or color area. For example, Japanese Patent Laid-Open No. 2004-034327 describes a method of determining a white/black/color pixel for each block.

Next, as sub-sampling processes, the following three processes are prepared.

(X) Edge sub-sampling process: a maximum color difference component in a block of 2×2 pixels is set as color difference plane data of the block.

(Y) Halftone dot sub-sampling process: an average value of color difference components in a block of 2×2 pixels is set as color difference plane data of the block.

(Z) Monochrome sub-sampling process (third sub-sampling): a minimum color difference component in a block of 2×2 pixels is set as color difference plane data of the block.

One of the sub-sampling processes (X) to (Z) is selected according to attribute information in an area (2×2 pixels) determined by the area attribute determination process 501 and color attribute determination process 801.

More specifically, the monochrome sub-sampling process (Z) is selected for an area determined as a monochrome area.

Figure 9:
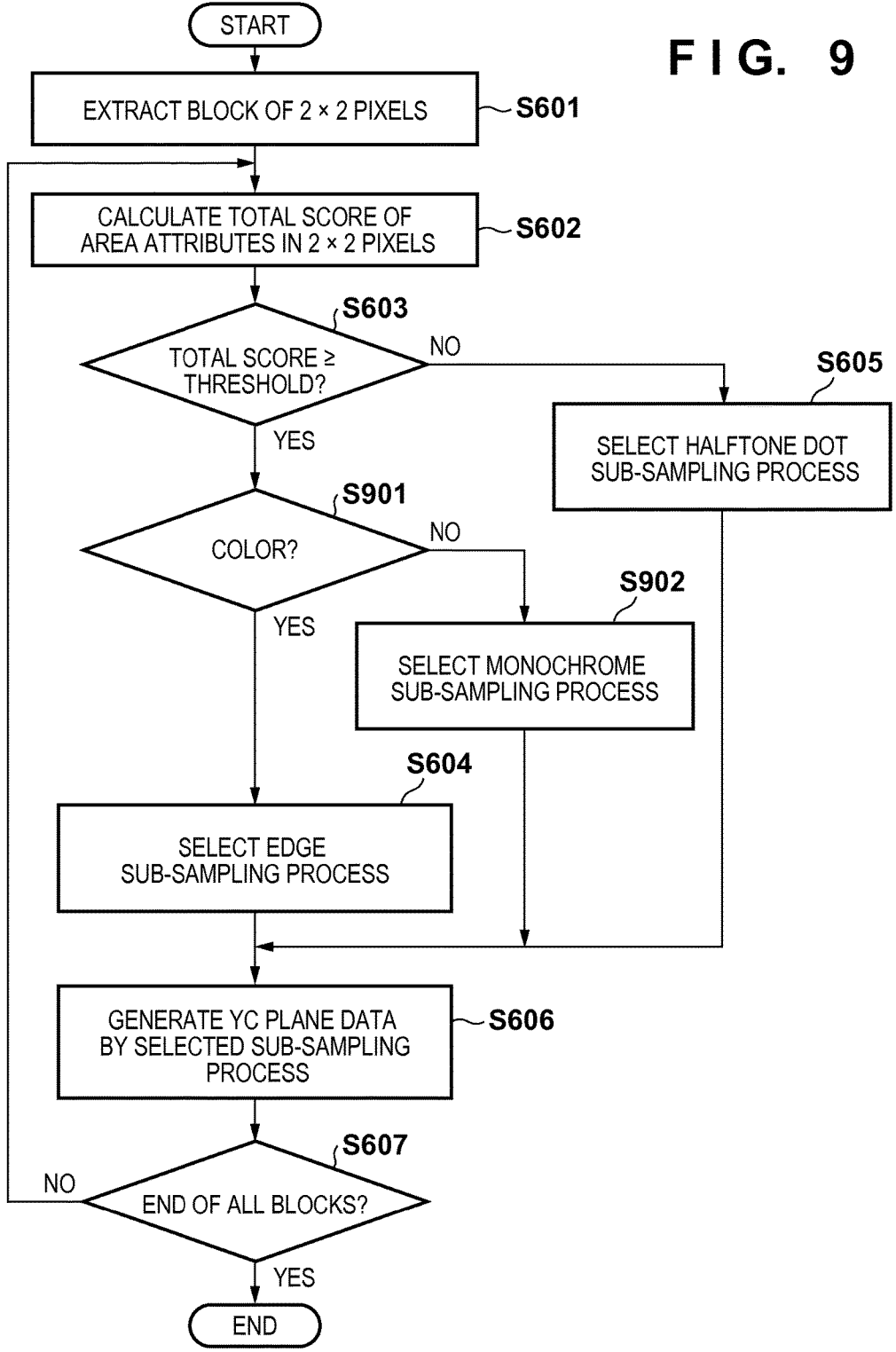
FIG. 9 is a flowchart for describing switching processing of sub-sampling processing in the MFP according to the second embodiment.

FIG. 9 is a flowchart for describing sub-sampling process switching processing in the MFP 1 according to the second embodiment. A program required to execute this processing is stored in a ROM 16, and this processing is implemented when a CPU 11 executes this program.

Note that in FIG. 9, the same step numbers denote processes common to FIG. 6 of the aforementioned first embodiment, and a description thereof will not be repeated.

In step S602, a total value of scores (area attribute total score) in 2×2 pixels is calculated with reference to an area attribute score table shown in FIG. 7A. The process then advances to step S603, and the CPU 11 compares the total value calculated in step S602 with a threshold, which is set in advance, so as to switch the sub-sampling process according to the comparison result. In this case, if the (area attribute total score)≥threshold, the CPU 11 determines that the target 2×2 pixels correspond to an edge, and the process advances to step S901; if the (area attribute total score)<threshold, it determines that the 2×2 pixels correspond to a halftone dot, and the process advances to step S605, thus selecting the halftone dot sub-sampling process (Y).

The CPU 11 determines in step S901 based on the processing result of the color attribute determination process 801 whether or not the image is a color image. If the image is a color image, the process advances to step S604 to select the edge sub-sampling process (X). On the other hand, if the CPU 11 determines in step S901 that the image is a monochrome image, the process advances to step S902 to select the monochrome sub-sampling process (Z). Using the sub-sampling process selected in step S604, S605, or S902 in this way, the CPU 11 generates luminance plane data (Y) and color difference plane data (Cb, Cr) in step S606.

With this arrangement, extra color difference components caused by CIS color misregistration can be reduced, thus obtaining an image with high image quality.

Note that the second embodiment has explained the case of 4:1:1 sub-sampling, but it is also applicable to other sub-sampling ratios (for example, 4:2:2).

As described above, according to the second embodiment, an appropriate sub-sampling process can be selected according to, for example, an attribute and color attribute of 2×2 pixels, and optimal coding processing can be executed according to the attributes of each area. Thus, image quality of an image formed based on decoded image data can be improved.

Also, since the aforementioned embodiments allow high-speed, high-compression, and high-image quality compression processing, various copy operations can be executed using an intermediate buffer of a small area.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

Also, all processes need not always be implemented by software, and some or all of the processes may be implemented by hardware such as an ASIC.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-154001, filed Jul. 9, 2012, which is hereby incorporated by reference herein in its entirety.

What is claimed is:

1. An apparatus comprising:
a processor; and
an image sensor that reads an original to obtain image data of the original,
wherein the processer determines an edge in the image data obtained by the reading of the original by the image sensor, and
wherein the processor sub-samples color difference components of a first area which is included in the image data and corresponds to the determined edge, by a first sub-sampling process, and sub-samples color difference components of a second area which is included in the image data and does not correspond to the determined edge, by a second sub-sampling process different from the first sub-sampling process.

2. The apparatus according to claim 1, wherein the processor encodes the image data of the original in which the first area is sub-sampled by the first sub-sampling process and the second area is sub-sampled by the second sub-sampling process.

3. The apparatus according to claim 2, wherein the apparatus further prints an image,
wherein the processor decodes image data corresponding to the image data of the original which has been encoded, and the apparatus prints an image based on the decoded image data.

4. The apparatus according to claim 3, wherein in a case where the apparatus executes a copy process, the processer executes sub-sampling by the first and second sub-sampling process and encodes the image data of the original and decodes image data corresponding to the image data of the original which has been encoded, and the apparatus prints an image based on the decoded image data.

5. The apparatus according to claim 2, wherein the processer encodes the image data of the original according to a JPEG standard.

6. The apparatus according to claim 1, wherein the processor generates luminance plane data and color difference plane data of the image data of the original by the sub-sampling,
and wherein the first sub-sampling process sets a maximum color difference component of pixels in the first area as the color difference plane data.

7. The apparatus according to claim 1, wherein the processer determines a monochrome area different from the second area, in the image data of the original, and
wherein the processer sub-samples the determined monochrome area by third sub-sampling process which sets a minimum color difference component of pixels in the determined monochrome area as the color difference plane data.

8. The apparatus according to claim 1, wherein the processor determines an area which includes at least a character area, as the first area.

9. The apparatus according to claim 1, wherein the processor determines an area which includes at least a halftone dot area, as the second area.

10. The apparatus according to claim 1, wherein the processor generates luminance plane data and color difference plane data of the image data of the original by the sub-sampling,
and wherein the second sub-sampling process sets an average value of color difference components of pixels in the second area as the color difference plane data.

11. A method for an apparatus comprising:
reading an original by an image sensor to obtain image data of the original;
determining an edge in the image data obtained in the reading by the image sensor,
executing sub-sampling of color difference components of a first area which is included in the image data and corresponds to the determined edge, by a first sub-sampling process, and sub-sampling of color difference components of a second area which is included in the image data and does not correspond to the determined edge, by a second sub-sampling process different from the first sub-sampling process.

12. The method according to claim 11, further comprising,
encoding the image data in which the first area is sub-sampled by the first sub-sampling process and the second area is sub-sampled by the second sub-sampling process.

13. The method according to claim 12, further comprising,
decoding image data corresponding to the image data of the original which has been encoded, and
printing an image based on the decoded image data.

14. The method according to claim 13, wherein in a case where the apparatus executes a copy process, the sub-sampling by the first and second sub-sampling process is executed, and the image data of the original is encoded and image data corresponding to the image data of the original which has been encoded is decoded, and an image based on the decoded image data is printed.

15. The method according to claim 12, wherein the image data of the original is encoded according to a JPEG standard.

16. The method according to claim 11, wherein luminance plane data and color difference plane data of the image data of the original are generated by the sub-sampling, and
wherein the first sub-sampling process sets a maximum color difference component of pixels in the first area as the color difference plane data, and the second sub-sampling process sets an average value of color difference components of pixels in the second area as the color difference plane data.

17. The method according to claim 16, wherein a monochrome area different from the second area is determined, in the image data of the original, and
wherein the determined monochrome area is sub-sampled by third sub-sampling process which sets a minimum color difference component of pixels in the determined monochrome area as the color difference plane data.

18. The method according to claim 11, wherein an area which includes at least a character area, is determined as the first area.

19. The method according to claim 11, wherein an area which includes at least a halftone dot area is determined as the second area.

20. A non-transitory storage medium storing a program for controlling a computer to execute an image processing method, comprising:
reading an original by an image sensor to obtain image data of the original;
determining an edge in the image data obtained in the reading by the image sensor,
executing sub-sampling of color difference components of a first area which is included in the image data and corresponds to the determined edge, by a first sub-sampling process, and sub-sampling of color difference components of a second area which is included in the image data and does not correspond to the determined edge, by a second sub-sampling process different from the first sub-sampling process.

* * * * *